US011074799B1

(12) United States Patent
Painter et al.

(10) Patent No.: US 11,074,799 B1
(45) Date of Patent: Jul. 27, 2021

(54) MODULAR TRACKING DEVICE

(71) Applicant: T-Mobile USA, Inc., Bellevue, WA (US)

(72) Inventors: Christopher Painter, Kirkland, WA (US); Todd Mason, Bellevue, WA (US); Barry Butterklee, Sammamish, WA (US); Gavin Feuer, Seattle, WA (US); Yasha Li, Redmond, WA (US); Parag Garg, Woodinville, WA (US); Joseph Baird, Kent, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/752,543

(22) Filed: Jan. 24, 2020

(51) Int. Cl.
  *G08B 1/08* (2006.01)
  *G08B 21/02* (2006.01)
  (Continued)

(52) U.S. Cl.
  CPC ............ *G08B 21/0291* (2013.01); *A01K 5/02* (2013.01); *A01K 11/006* (2013.01); *A01K 27/009* (2013.01); *G08B 3/10* (2013.01); *G08B 21/0211* (2013.01); *G08B 21/0272* (2013.01); *G08B 21/0275* (2013.01); *A01K 11/008* (2013.01)

(58) Field of Classification Search
  CPC .. G08B 21/0291; G08B 3/10; G08B 21/0211; G08B 21/0272; G08B 21/0275; A01K 5/02; A01K 11/006; A01K 27/009; A01K 11/008
  See application file for complete search history.

(56) References Cited

U.S. PATENT DOCUMENTS 6,462,660 B1 *  10/2002  Cannon ............... G08B 13/1427
                                                340/539.1
6,548,990 B2 *  4/2003   Okuno ...................... H02J 7/14
                                                  322/17
(Continued)

FOREIGN PATENT DOCUMENTS

WO     2017142840 A1     8/2017

OTHER PUBLICATIONS

Bachpalle et al., Integration of Sensors for Location Tracking using Internet of Things (Year: 2018).*

(Continued)

*Primary Examiner* — Quang Pham
(74) *Attorney, Agent, or Firm* — Han Santos, PLLC

(57) ABSTRACT

Techniques and examples pertaining to a tracking method using a two-component tracking device are described. The tracking device includes two components paired with one another: a first component that is specific to a subject the tracking device is intended to track, and a second component that is generic. The second component is capable of establishing a wireless connection with a cellular network, as well as collecting location information of the second component itself. The tracking method involves receiving from the cellular network a set of requirements associated with the subject, and triggering an action based on the set of requirements and the location information collected. The tracking method enables tracking of multiple subjects without a pairing mistake. Namely, a mismatch between multiple subjects to be tracked and multiple tracking devices intended to track the subjects can be avoided.

19 Claims, 4 Drawing Sheets

(51) Int. Cl.
  *G08B 3/10* (2006.01)
  *A01K 11/00* (2006.01)
  *A01K 5/02* (2006.01)
  *A01K 27/00* (2006.01)

(56) References Cited

U.S. PATENT DOCUMENTS

| | | | |
|---|---|---|---|
| 7,825,794 B2* | 11/2010 | Janetis | H04W 4/02 |
| | | | 340/539.13 |
| 8,851,019 B2* | 10/2014 | Jesurum | A01K 15/029 |
| | | | 119/721 |
| 9,226,150 B2 | 12/2015 | Li et al. | |
| 9,801,017 B2 | 10/2017 | Choi et al. | |
| 9,820,231 B2 | 11/2017 | Gorgenyi et al. | |
| 9,967,391 B2 | 5/2018 | Frenz et al. | |
| 9,998,866 B2 | 6/2018 | Natucci, Jr. et al. | |
| 10,395,452 B2* | 8/2019 | Morrison | H04W 12/065 |
| 10,484,090 B2* | 11/2019 | Saes | H04B 10/60 |
| 10,750,044 B2* | 8/2020 | Hayashi | H04N 1/00949 |
| 10,764,907 B2 | 9/2020 | Ravindran et al. | |
| 2006/0055536 A1* | 3/2006 | Jackson | G08B 21/023 |
| | | | 340/572.1 |
| 2006/0066450 A1* | 3/2006 | Jackson | G01S 5/02 |
| | | | 340/539.13 |
| 2006/0221893 A1* | 10/2006 | Kiss | H04L 61/1564 |
| | | | 370/328 |
| 2007/0150607 A1* | 6/2007 | Flinchem | H04M 1/7243 |
| | | | 709/228 |
| 2008/0191866 A1* | 8/2008 | Falck | G16H 40/67 |
| | | | 340/539.12 |
| 2009/0231125 A1* | 9/2009 | Baldus | A61B 5/0006 |
| | | | 340/539.12 |
| 2009/0289844 A1* | 11/2009 | Palsgrave | A01K 15/021 |
| | | | 342/357.55 |
| 2010/0027513 A1* | 2/2010 | Ikeda | H04W 16/06 |
| | | | 370/337 |
| 2010/0123560 A1* | 5/2010 | Nix | H04Q 9/00 |
| | | | 340/10.4 |
| 2010/0138581 A1* | 6/2010 | Bird | H04H 20/62 |
| | | | 710/303 |
| 2011/0092161 A1* | 4/2011 | Dotan | G08B 21/0225 |
| | | | 455/41.3 |
| 2011/0274093 A1* | 11/2011 | Sing | H04W 48/12 |
| | | | 370/338 |
| 2011/0297090 A1* | 12/2011 | Chamberlain | A01K 5/0291 |
| | | | 119/51.02 |
| 2012/0034946 A1* | 2/2012 | Skalicky | H04W 4/023 |
| | | | 455/521 |
| 2012/0090038 A1* | 4/2012 | Pacella | G06Q 20/32 |
| | | | 726/30 |
| 2012/0309376 A1 | 12/2012 | Huang et al. | |
| 2013/0159749 A1* | 6/2013 | Moeglein | H04W 52/0229 |
| | | | 713/323 |
| 2014/0073300 A1* | 3/2014 | Leeder | H04M 3/42348 |
| | | | 455/416 |
| 2014/0141795 A1 | 5/2014 | Abraham et al. | |
| 2014/0241354 A1 | 8/2014 | Shuman et al. | |
| 2014/0251233 A1* | 9/2014 | Bianchi | G08B 23/00 |
| | | | 119/720 |
| 2014/0331295 A1* | 11/2014 | Kumar | H04W 12/068 |
| | | | 726/6 |
| 2015/0046330 A1* | 2/2015 | Hanafi | G06Q 20/325 |
| | | | 705/44 |
| 2015/0350410 A1* | 12/2015 | Weiss | H04W 4/021 |
| | | | 455/418 |
| 2016/0021506 A1* | 1/2016 | Bonge, Jr. | A01K 15/023 |
| | | | 717/173 |
| 2016/0044628 A1 | 2/2016 | Nakao | |
| 2016/0266606 A1* | 9/2016 | Ricci | H04M 1/72412 |
| 2016/0287097 A1* | 10/2016 | Pradeep | A61B 5/7264 |
| 2016/0292576 A1* | 10/2016 | Pradeep | G06F 19/00 |
| 2016/0302393 A1* | 10/2016 | Pradeep | A01K 29/005 |
| 2017/0111763 A1* | 4/2017 | Morgan | H04B 7/0617 |
| 2017/0132900 A1* | 5/2017 | Lee | H04W 4/02 |
| 2017/0357835 A1* | 12/2017 | Oono | G06K 17/0022 |
| 2018/0121993 A1* | 5/2018 | Agarwal | G06Q 30/0635 |
| 2018/0184253 A1* | 6/2018 | De Lorenzo | H04W 4/021 |
| 2018/0255428 A1 | 9/2018 | Bagchi et al. | |
| 2018/0295472 A1* | 10/2018 | High | H04W 8/18 |
| 2018/0332033 A1* | 11/2018 | Lakhani | G06F 21/35 |
| 2018/0365964 A1* | 12/2018 | Carson | G01L 5/0052 |
| 2018/0376417 A1 | 12/2018 | Wang et al. | |
| 2019/0087087 A1* | 3/2019 | Ono | G06F 3/0485 |
| 2019/0156643 A1* | 5/2019 | Quilter | G08B 21/0227 |
| 2019/0171988 A1 | 6/2019 | Kwatra et al. | |
| 2019/0208356 A1 | 7/2019 | Danknick | |
| 2019/0289158 A1* | 9/2019 | Inoue | G06F 9/4843 |
| 2019/0371102 A1* | 12/2019 | Prostko | G06K 9/00476 |
| 2020/0042947 A1 | 2/2020 | Rakshit et al. | |
| 2020/0187452 A1* | 6/2020 | Daniel | A01K 5/0225 |
| 2020/0235994 A1 | 7/2020 | Rusev et al. | |
| 2020/0296234 A1* | 9/2020 | Saita | G06F 3/1238 |

OTHER PUBLICATIONS

Balakrishnan et al., Efficient Geo-Tracking and Adaptive Routing of Mobile Assets (Year: 2009).*

Garzon et al., Infrastructure-Assisted Geofencing Proactive Location-Based Services with Thin Mobile Clients and Smart Servers (Year: 2015).*

He et al., User privacy and data trustworthiness in mobile crowd sensing (Year: 2015).*

Kulshredtha et al., An Improved Smartphone-Based Non-Participatory Crowd Monitoring System in Smart Environments (Year: 2017).*

Schmitt et al., OTIoT—A browser-based object tracking solution for the Internet of Things (Year: 2018).*

Shivhare et al., A Study On Geo-Location Authentication (Year: 2014).*

Tang et al., A smart low-consumption IoT framework for location tracking and its real application (Year: 2016).*

Thengal et al., Parameter sensing and object tracking using global positioning system (Year: 2017).*

U.S. Appl. No. 16/252,506, Non Final Office Action dated Mar. 19, 2020, 17 pages.

U.S. Appl. No. 16/252,506, Final Office Action dated Sep. 22, 2020, 24 pages.

U.S. Appl. No. 16/690,053, Office Action dated Mar. 8, 2021, 57 pages.

* cited by examiner

MODULAR TRACKING DEVICE

BACKGROUND

Tracking devices can be employed to track subjects or items that are frequently moving, easily lost, or often misplaced. For example, items such as wallets, remote controllers, car keys, or cellular phones are often misplaced in or around a house, and thus become difficult to find when needed. Valuable personal items that people bring with them, such as purses, backpacks, luggage cases, coats, bikes, skis, or golf clubs, when going places or doing outdoor sports, may be stolen or unintentionally taken by someone else. A subject of tracking (hereinafter referred as a "tracking subject", or simply "subject") may be an inanimate thing as mentioned above, or a living creature such as a person or an animal Such a subject may be located or otherwise tracked using a tracking device that is physically attached to, or co-located with, the subject. The tracking device is capable of transmitting or reporting the immediate location of the subject using a wireless signal. A tracking system may receive the wireless signal to locate and track the subject.

A tracking scenario may involve tracking of multiple subjects. For each subject to be tracked, a corresponding tracking device (hereinafter interchangeably referred as a "tracker") is needed. Each tracker has an identification that can be used to distinguish the tracker from other trackers. The identification of the tracker can be included in the wireless signal along with the immediate location of the subject. Plus, each tracker is associated with a subject to be tracked through a one-to-one correspondence, which is typically manually configured. The one-to-one correspondences between trackers and subjects being tracked are often saved in the tracking system in the form of a look-up table. Thus, the tracking system would be able to identify which wireless signal represents which subject. For example, a household may have a remote controller for controlling a television (TV), and a remote controller for controlling an air conditioning unit (A/C). In order to track both remote controllers so that they can be readily found when needed, two trackers are required: a first tracker that is physically attached to the TV remote controller for tracking the TV remote controller, and a second tracker that is physically attached to the A/C remote controller for tracking the A/C remote controller. Each of the first and second trackers is able to transmit a respective wireless signal that conveys information of an immediate location of the tracker, as well as its respective identification. Since the two tracking devices are co-located with the two remote controllers, respectively, the whereabouts of the remote controllers would be made known to a tracking system that receives the wireless signals transmitted from the tracking devices. A user can thus access the tracking system for this information to locate the remote controllers.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

Figure 1:
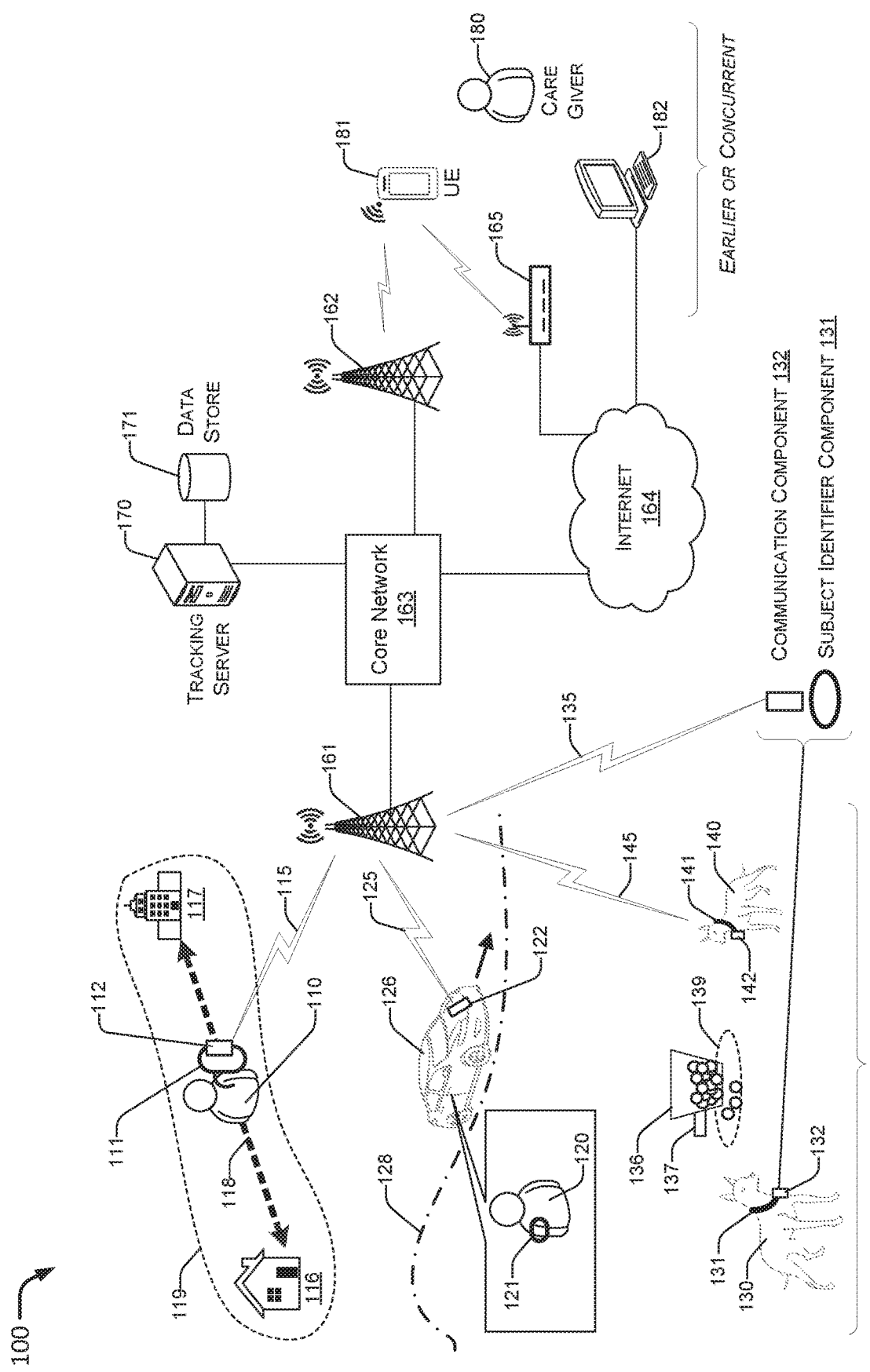
FIG. 1 shows an illustrative tracking scenario and network architecture for tracking multiple subjects using two-component tracking devices.

This disclosure is directed to devices, systems, and techniques for enabling tracking of a subject using a modular tracking device that encompasses at least two components: a subject identifier component that carries an identification of the subject, as well as a communication component that had been generic until being paired with the subject identifier component to form the tracking device. Moreover, once the tracking device is successfully established to track the subject consistent with one or more embodiments variously described herein, functionalities of the tracking device can be automatically configured or otherwise customized according to a set of requirements specific to the tracking subject and/or a user of the tracking device. As explained below, since the communication component is generic by itself, the modular tracking device is not susceptible to a problem of tracker-subject mismatch that is common to existing, non-modular, tracking devices.

For non-modular tracking devices, a practical problem of "pairing mistake", or "tracker-subject mismatch", may arise in a tracking scenario that involves multiple subjects being tracked simultaneously using as many tracking devices. Typically, each of the tracking devices contains a battery that provides its power, and thus needs to be temporarily detached from the corresponding subject (i.e., the subject the tracker is associated with and attached to) from time to time for replacing or recharging the battery. In an event that multiple trackers are detached from subjects for battery replacement or recharging, it is possible that some of the trackers are swapped or mixed up and end up being attached to wrong subjects by mistake after the battery replacement/recharging, resulting in a pairing mistake. Namely, a pairing mistake emerges when there is a tracker-subject mismatch, i.e., when a tracking device is attached to a subject that is not associated with the tracking device as listed in the look-up table saved at the tracking system. In the example of the remote controllers as described above, assume that the two tracking devices are swapped by mistake (i.e., the first tracking device, which is supposed to be attached to the TV remote controller according to the one-to-one correspondence in the loop-up table, is attached to the A/C remote controller instead, whereas the second tracking device, which is supposed to be attached to the A/C remote controller according to the one-to-one correspondence in the look-up table, is attached to the TV remote controller). The tracking system would still, based on the look-up table, identify the location reported by the first tracking device as the location of TV remote controller, even though in reality the location reported by the first tracking device is actually the location of the A/C remote controller, as the first tracking device is attached to the A/C remote controller by mistake. Likewise, the tracking system would identify the location reported by the second tracking device as the location of A/C remote controller, whereas it is indeed the location of the TV remote controller.

The problem of tracker-subject mismatch becomes worse when the number of subjects being tracked becomes larger. For example, a farm owner may have a need to track cattle of hundreds of cows. That means hundreds of trackers may need to be periodically detached from the cows for battery recharging. It would be nearly impossible to ensure every one of the hundreds of trackers, after being detached from the cows and recharged, is again correctly attached to the cow that the tracker is intended to track, as specified by the one-to-one correspondence recorded in the look-up table. In general, for practical purposes, pairing mistakes between non-modular trackers and subjects are difficult to avoid in scenarios where many subjects are intended to be tracked. In contrast, a modular tracking device disclosed herein is free from a pairing mistake or a tracker-subject mismatch.

In accordance with example embodiments, a modular tracking device includes a communication component and a subject identifier component. The two components are two distinct parts that are physically separable. Specifically, the two components are co-located in one place, and paired with one another, when tracking a subject; yet they can be separated from one another in two places when not in a tracking mode. The communication component is capable of collecting information regarding its own location and transmitting the location information via a wireless signal (e.g., through a wireless communication channel that the communication component has established with a cellular network). The subject identifier component includes or otherwise stores an identification that identifies a subject. For each subject to be tracked, a respective subject identifier component is needed. The communication component, on the other hand, may be generic. That is, the communication component, by and in itself, may not include an identification of any subject, and thus is able to pair with different subject identifier components to form different tracking devices for tracking different subjects.

The communication component may include a battery as a power source, and the tracking device may be designed such that most of the power consumption of the tracking device (e.g., due to activities such as collecting the location information and/or sending the wireless signal) is drawn from the battery. The subject identifier component, on the other hand, is designed to consume very little or even no power. Therefore, the subject identifier component can remain attached to or otherwise co-located with the subject for a long or even an indefinite period of time without a concern of running out of power; in example embodiments, it is only the communication component that may need to be periodically detached from the subject for replacing or recharging the battery therein. This feature can prevent tracker-subject mismatches in the scenario where multiple subjects are to be tracked. For example, multiple communication components, which are all generic, can be arbitrarily attached to the subjects, one communication component to a respective one subject. Each communication component then pairs with the subject identifier component that remains attached to the respective subject to form a tracking device for tracking the specific subject. The pairing of multiple generic communication components to multiple subject identifier components to form multiple tracking devices each tracking a specific subject eliminates the problem of tracker-subject mismatch altogether.

When tracking a particular subject, both the communication component and the subject identifier component are co-located with the subject. As mentioned above, the subject identifier component stores or otherwise carries a subject identification that identifies the subject. The communication component pairs with the subject identifier component to obtain the subject identification of the subject from the subject identifier component. The communication component may periodically transmit to a tracking system a wireless signal that contains or otherwise represents the location information and the identification of the subject. Since the tracking device (i.e., the combination of the communication component and the subject identifier component) is co-located with the subject, the tracking system is thus able to track the whereabouts of the subject based on the wireless signal received.

In addition to providing the whereabouts of the subject, the tracking device may, as noted in greater detail further below, be customized to perform other tracking functions tailored to various needs of the subject. Specifically, via the communication component, the tracking device may wirelessly receive one or more requirements that reflect the subject's needs. Based on the requirements and the location information, the tracking device can trigger an action to meet a need of the subject. The action can, for example, be performed by the tracking device itself, i.e., by the communication component, the subject identifier component, or a combination of both. Alternatively or additionally, the action can be performed by an environment within which the subject is located, such as an apparatus that is in a vicinity of the subject or can interact with the subject. For example, the tracking device may trigger a light source to provide a higher level of illumination to the subject, or a door to open for the subject to travel through.

Example Architecture and Operation Principles

FIG. 1 shows an illustrative tracking scenario 100 and network architecture for tracking multiple subjects. In the tracking scenario 100, four subjects are intended to be tracked: a pedestrian 110, a vehicle occupant 120, and animals 130 and 140. The pedestrian 110 is moving between two locations 116 and 117 along a predetermined route 118. The vehicle occupant 120 is seated in a vehicle 126 that travels along a trajectory 128. The animals 130 and 140 are free to move within an environment, which includes an apparatus 136. Solely for purposes of illustration and by no means limiting the scope of the present disclosure, the pedestrian 110 may be a child who is supposed to leave a house 116 for a school 117 in the morning, and to return to the house 116 from the school 117 in the afternoon, along the predetermined route 118. The vehicle occupant 120 may be an adult who rides the vehicle 126 either as a driver or a passenger. Both animals 130 and 140 may be pets of a household, and the apparatus 136 may be a pet food dispenser that is used to dispense pet food to pets 130 and 140.

As subjects intended to be tracked, each of the child 110, the adult 120, the pet 130 and the pet 140 has a subject identifier component, labeled as numerals 111, 121, 131 and 141, respectively, that is co-located with the respective subject. For example, the subject identifier component 111 co-located with the child 110 may be a backpack that is carried by the child on a school day; the subject identifier component 121 co-located with the adult 120 may be an arm band worn by the adult 120; the subject identifier component 131 co-located with the pet 130 may be a collar worn by the pet 130; similarly, the pet 140 may be wearing a collar 141 as a subject identifier component.

Each of the subject identifier components 111, 121, 131 and 141 includes a subject identification that identifies the respective subject. The subject identification may be, for example, a serial number that identifies the respective subject. In some embodiments, the subject identification may be stored, carried, or otherwise included in the subject identifier component in the form of a radio-frequency identification (RFID) tag or a near-field communication (NFC) tag. In some embodiments, the subject identification may be digitally stored in memory or a data store contained in the subject identifier component. In some embodiments, the subject identification may be represented by a mechanical shape, such as mechanical pins of different lengths. In the tracking scenario 100, the subject identifications included in the backpack 111, the arm band 121, and the collars 131 and 141 are different from each other so that each of the tracking subjects (i.e., the child 110, the adult 120, and the pets 130 and 140) can be uniquely identified using the subject identification included in the respective subject identifier component.

In order to form a tracking device that works, each of the subject identifier components 111, 121, 131 and 141 needs to be paired with a communication component that is co-located with the corresponding subject identifier. Since the communication component and the subject identifier component are co-located with the corresponding tracking subject, the two components may use a short-range communication protocol, such as NFC, RFID, Bluetooth® (BT) or Bluetooth® low energy (BLE), to pair with one another. The pairing involves the communication component having access to the subject identification that is stored, carried, or included in the subject identifier component. In some embodiments, the pairing involves the communication component obtaining the subject identification from the subject identifier component. Once paired, the communication component and the corresponding subject identifier component together form a tracking device for tracking the subject identified by the subject identification.

In an example embodiment encompassed by the tracking scenario 100, a communication component 112 is placed in or attached to the backpack 111 carried by the child 110. The backpack 111 carries a subject identification that identifies the child 110, and the communication component 112 is paired with the backpack 111 to form a tracking device for tracking the child 110. For the adult 120, a communication component 122 is disposed in the vehicle 126 that transports the adult 120 who wears the arm band 121. The arm band 121 carries a subject identification that identifies the adult 120, and the communication component 122 is paired with the arm band 121 to form a tracking device for tracking the adult 120. Likewise, for the pet 130, a communication component 132 is placed in or attached to the collar 131 worn by the pet 130. The collar 131 carries a subject identification that identifies the pet 130, and the communication component 132 is paired with the collar 131 to form a tracking device for tracking the pet 130. Similarly, a communication component 142 is placed in or attached to the collar 141 worn by the pet 140, and the communication component 142 is paired with the collar 141 to form a tracking device for tracking the pet 140.

In some example embodiments, the pairing between a communication component and a subject identifier component may employ a short-range communication protocol that is effective over only a short range. A communication component automatically pairs with a subject identifier when the distance between the communication component and the subject identifier component is within the short range. Alternatively, a communication component may be manually paired with a subject identifier component. For example, a user may press either a button on the communication component, or a button on the subject identifier component, or both buttons simultaneously, to pair the two components to one another. Once a communication component is paired with a first subject identifier component, the communication component is not available to pair with a second subject identifier component until the communication component is unpaired from the first subject identifier component.

Likewise, a communication component automatically becomes unpaired when the distance between the communication component and a nearest subject identifier component exceeds the short range of the short-range communication protocol. Alternatively, a communication component may be manually unpaired with a subject identifier component even if the communication component and the subject identifier component are currently paired with one another. For example, a user may press either a button on the communication component, or a button on the subject identifier component, or both buttons simultaneously, to unpair the two components from one another.

Once a communication component is unpaired from a subject identifier component, it becomes generic. That is, a generic communication component is no longer paired with a subject identifier component to track any subject. A generic communication component is thus available to pair with any subject identifier component to form a tracking device. Therefore, in a multi-tracking-subject scenario, a number of generic communication components can be randomly attached to, or put together with, the tracking subjects for tracking, thereby eliminating the problem of pairing mistakes, i.e., tracker-subject mismatches. For example, in the scenario 100, the child 110, the adult 120, as well as the pets 130 and 140 may belong to a same household and live in the house 116. Each of the communication components 112, 122, 132 and 142 may have a battery that provides the power source. During the night time, the communication components 112, 122, 132 and 142 may be detached and unpaired from the subject identifier components (i.e., the backpack 111, the arm band 121, and the collars 131 and 141) for recharging the batteries therein. The communication components 112, 122, 132 and 142 remain generic as they are being charged. The next morning, after the batteries have been charged, the child 110 and the adult 120 may each pick up any one of the generic communication components 112, 122, 132 and 142 before leaving the house 116. Even if a communication component different from the one used in the previous day is picked up, the communication component, being generic when picked up, can still pair with the backpack 111 or the arm band 121 to track the child 110 or the adult 120 without having a pairing mistake. Similarly, any of the generic communication components 112, 122, 132 and 142 can be attached to the collar 131 to track the pet 130, which wears the collar 131, and to the collar 141 to track the pet 140, which wears the collar 141.

Each of the communication components 112, 122, 132 and 142 is capable of collecting a location information of itself, which is substantially equivalent to a location information of the tracking subject, as the communication component, when in the tracking mode, is co-located with the tracking subject. In some embodiments, the location information may include a geolocation of the communication component. The communication component may be able to triangulate its immediate location using location information of nearby cellular towers of a cellular network, such as cellular towers 161 and 162. Alternatively or additionally, the communication component may determine its own immediate location using one or more of various positioning or geolocating techniques, such as global positioning system (GPS), global navigation satellite system (GLONASS), Wi-Fi positioning system (WPS), or Internet geolocation. In some embodiments, the location information may also include characteristics of a movement of the communication component, such as a speed, a direction, an acceleration/deceleration, or a motion pattern (e.g., whether the tracking subject may be running, jogging, walking, jumping, or riding a vehicle). In some embodiments, the location information may further include an altitude of the communication component.

In addition to being capable of collecting the location information, the communication components 112, 122, 132 and 142 are also capable of establishing wireless connections 115, 125, 135 and 145, respectively, with a cellular network, which includes a plurality of base stations or cellular towers (e.g., the cellular towers 161 and 162), as well as a core network (e.g., the core network 163). Once the communication components are paired with the subject identifier components to have access to the subject identifications of the subjects being tracked, the communication components transmit the subject identifications to the cellular network, and then receive one or more requirements associated with the tracking subjects in return. That is, each of the tracking subject has a set of requirements associated with it, and the communication component co-located with the tracking subject would receive the set of requirements from the cellular network in response to the communication component transmitting the subject identification of the tracking subject to the cellular network. Specifically, the cellular network further includes a tracking server 170 that is communicatively coupled to the core network 163, and the set of requirements is supplied to the communication component by the tracking server 170. The set of requirements is saved in a data store 171 that is communicatively coupled to the tracking server 170. In an example embodiment, various requirements, tracking data, and/or additional information about the subject can be stored on the subject identifier component and optionally later updated from the cellular network, for example to enable the communication component to act or track in specific ways until requirements are confirmed or updated with information from the cellular network. In general, the data store 171 serves as a database which stores many sets of requirements, one set for each tracking subject. Therefore, there may be a first set of requirements associated with the child 110, a second set of requirements associated with the adult 120, a third set of requirements associated with the pet 130, and a fourth set of requirements associated with the pet 140, all saved in the data store 171. The core network 163 of the cellular network passes a subject identification transmitted from a communication component to the tracking server 170. Based on the subject identification, which identifies a particular tracking subject, the tracking server 170 queries the data store 171 to fetch the set of requirements associated with the particular tracking subject from the data store 171. The tracking server 170 subsequently sends the set of requirements to the communication component co-located with the particular tracking subject, e.g., via a communication link comprising the core network 163, the cellular tower 161, and one of the wireless connections 115, 125, 135 and 145. Depending on the specifics of the set of requirements, the communication component may transmit the location information it has collected to the tracking server 170 via the communication link. The tracking server 170 may save the location information in the data store 171. Various actions regarding the particular tracking subject can then be triggered by the tracking server 170 based on the location information and the set of requirements. For example, the set of requirements may trigger an action that an immediate location of the communication component be reported periodically to the tracking server 170 after the tracking subject enters or leaves a predetermined area. Various actions can also be triggered by the communication component based on the location information and the set of requirements. Namely, based on the location information and the set of requirements, either the tracking server 170 or the communication component can determine an action to be performed with respect to the tracking subject. The action can be performed by the tracking server 170, the communication component, the subject identifier component, or an environment within which the tracking subject is located.

Take the tracking of the child 110 for example. The communication component 112 transmits the subject identification that identifies the child 110 to the tracking server 170. Based on the subject identification, the tracking server 170 fetches from the data store 171 one or more requirements associated with the child 110. The communication component 112 then receives the one or more requirements from the tracking server 170. A copy of the one or more requirements may be saved in a memory cache of the communication component 112 such that they are available to the communication component 112 even if the wireless connection 115 is lost or interrupted later (e.g., the child 110 may later travel to a region out of the communication coverage of the cellular network).

The one or more requirements associated with the child 110 may include a map specifying boundaries of a geographical area 119 within which the child is allowed or expected to travel on a school day. The one or more requirements associated with the child 110 may also include an instruction to command the tracking device (i.e., the communication component 112, the backpack 111, or a combination of both) to trigger certain action or actions based on a location of the child 110 relative to the geographical area 119. For example, the one or more requirements may command the communication component 112 to continuously or periodically report the location information of the child 110 to the tracking server 170 should the child 110 leave the geographical area 119.

The one or more requirements associated with the child 110 may be previously entered into the data store 171 by a care giver 180 of the child 110, such as a parent of the child 110. The care giver 180 sends to the tracking server 170 the one or more requirements, which can be saved in the data store 171, using either a user equipment (UE) 181 (e.g., a cell phone, a tablet, or any other electronic device with wireless communication ability) or an interface terminal 182. The UE 181 can establish a wireless connection to, for example, the cellular tower 162 of the cellular network, which in turn is connected to the core network 163 of the cellular network. The interface terminal 182 is connected to the core network 163 via Internet 164. In some embodiments, the UE 181 may, instead of connecting to the cellular tower 162, connect to a wireless router 165 that can access the Internet 164. Each of the various connection paths described above can be a path used by the care giver 180 to send the one or more requirements associated with the child 110 to the tracking server 170 via the core network 163 of the cellular network.

Assume that, as the child 110 travels, the communication between the communication component 112 and the tracking server 170 is not interrupted and thus the communication component 112 is able to report, at least on a regular basis, the location information of the child 110 to the tracking server 170. In this event, both the tracking server 170 and the communication component 112 have the same information regarding the child 110 to trigger an action, if needed. That is, both the tracking server 170 and the communication component 112 have access to the location information of the child 110 as well as the one or more requirements associated with the child 110. Therefore, both the tracking server 170 and the communication component 112 are able to trigger an action based on the location information of the child 110 and the one or more requirements associated with the child 110. For example, in response to the child 110 traveling outside the geographical area 119, the tracking server 170 can, for example, send a notification in the form of a text message such as a Short Message Service (SMS) message, a voice mail, or an email message to the care giver 180. On the other hand, the communication component 112 can, for example, trigger an action to warn the child 110 that he or she is wandering outside the geographical area 119, so that the child 110 may be reminded to return to the route 118.

However, it is also possible that, for some reason, the wireless connection 115 has already been lost when the child 110 leaves the geographical area 119. It follows that the location information of the child 110 after the wireless connection 115 is lost would not be available to the tracking server 170. In this event, the tracking server 170 may send a notification to the care giver indicating that the location information of the child 110 is no longer available, at least to the tracking server 170. Nevertheless, the communication component 112 is still functioning, still collecting the location information of the child 110, and still having access to the copy of the one or more requirements of the child 110 that is saved in the memory cache of the communication component 112. Therefore, the communication component 112 is still able to trigger actions based on the location information and the one or more requirements, even if the wireless connection 115 has been lost. For example, in response to the child 110 traveling outside the geographical area 119, the communication component 112 may use a speaker included in the communication component 112 to generate a series of beeps or an alert sound to remind the child 110 to return to the route 118.

As described above, the care giver 180 may send the one or more requirements associated with the child 110 to the tracking server 170 before the tracking of the child 110 commences. For example, the map of the geographical area 119 may be entered by the care giver 180 a few days before a school year begins for the child 110. In some embodiments, however, further requirements may be entered, or existing requirements overridden, concurrently as the tracking subject is being tracked. For example, on one particular school day, the child 110 may be going on a field trip from school 117 to a destination that is located outside the geographical area 119. As the child 110 leaves the geographical area 119 on the field trip, the tracking server 170 may send a text message to notify the care giver 180 about the incidence of the child 110 leaving the geographical area 119; meanwhile, the speaker of the communication component 112 may keep generating a beeping alert to remind the child 110 to return within the geographical area 119, while the child 110 is still on the field trip. Upon receiving the text message from the tracking server 170, the care giver 180 recalls that the child 110 is indeed scheduled for the field trip on that particular school day, and the field trip would require the child 110 to travel out of the geographical area 119. The care giver 180 then updates the requirements in the data store 171 to make an exception to allow the child 110 to leave the geographical area 119 for the field trip on that particular day. The tracking server 170 then sends the updated requirements associated with the child 110 to the communication component 112. Based on the updated requirements, the communication component 112 can for example mute the beeping alert accordingly.

More aggressive actions can be triggered when the location information indicates a possible danger of the child 110. For example, in addition to an immediate location of the child 110 that is outside the geographical area 119, the location information collected by the communication component 112 also indicates an abrupt elevation drop, which may possibly be resulted from the child 110 having experienced a physical fall. In response, the communication component 112 or the tracking server 170 can for example trigger the speaker of the communication component 112 to generate a loud siren sound to attract attention of anybody who happens to be near the child 110. The triggered actions may further include the communication component 112 or the tracking server 170 sending a notification or making a phone call to the school 117, a police department, and/or a rescue capacity, to inform them about the possible dangerous situation of the child 110. In an event that the communication component 112, rather than the tracking server 170, triggers an action, the communication component 112 may transmit to the tracking server 170 via the wireless connection 115 an action indication that indicates the triggering of the actions. The action indication may even include certain details of the actions triggered.

In the example embodiment above, the generation of the beeping sound or the loud siren sound is performed by the communication component 112. In some embodiments, the action can instead be performed by the subject identifier component paired with the communication component 112, i.e., the backpack 111, or by a combination of both the communication component 112 and the subject identifier component 111. For example, whereas the communication component 112 is usually small in size and thus not able to allow for a powerful speaker, let alone a high-capacity battery feeding power to the powerful speaker, the backpack 111 can for example be equipped with a bigger and more powerful speaker. The backpack 111 may be further equipped with a high-capacity battery that serves as a power source for the bigger speaker. Accordingly, the action of generating the beeping sound or the loud siren sound, as described above, can alternatively be performed by the bigger speaker of the backpack 111, rather than by the small speaker of the communication component 112. This may be a more preferred approach, as the powerful speaker of the backpack 111, combined with the high-capacity battery of the backpack 111, is able to make the beeping or siren sound louder and last longer. A further advantage is that the battery of the communication component 112 would thus not be drained by the generation of the sounds; rather, the electrical power therein is saved to sustain the wireless connection 115 for a longer time before a recharge is needed. In some embodiments, the communication component 112 is physically hooked up with the backpack 111, and the high-capacity battery of the backpack 111 can directly power the communication component 112, thereby being able to sustain the tracking of the child 110 for an even longer time.

In order for the communication component 112 to take advantage of the powerful speaker as well as the high-capacity battery that the backpack 111 has, as noted earlier, such information needs to be communicated to the communication component 112 beforehand Specifically, such information is made known to the communication component 112 by the communication component 112 receiving a functionality profile from the backpack 111 as part of the pairing process between the communication component 112 and the backpack 111. Specifically, the functionality profile explicitly describes a plurality of functionalities of the subject identifier component. That is, the functionality profile stored or otherwise included in the backpack 111 explicitly describes that the backpack 111 is equipped with a powerful speaker and a high-capacity battery. The communication component 112 then transmits the functionality profile of the backpack 111, along with the subject identification that specifies the child 110, to the tracking server 170. The tracking server 170 queries the data store 171 using not only the subject identification of the child 110, but also the functionality profile of the backpack 111, and the data store 171 responds to the tracking server 170 with one or more requirements associated with the child 110 that involve utilizing the powerful speaker and/or the high-capacity battery of the backpack 111. Namely, the one or more requirements further specify how the subject identifier component, i.e., the backpack 111, is intended to be used in performing an action as described earlier. The one or more requirements may have been entered into the data store 171 by the care giver 180, as noted above. The communication component 112 subsequently receives the one or more requirements from the tracking server 170, and triggers an action based on the one or more requirements and the location information of the child 110, as described earlier.

The functionality profile is stored, embedded, or otherwise included in the backpack 111 similar to how the subject identification that identifies the child 110 is stored or included in the backpack 111. A distinctive difference between a functionality profile and a subject identification that are stored in a particular subject identifier component resides in that, whereas the subject identification identifies a particular tracking subject and thus is uniquely associated with that particular tracking subject, the functionality profile is not uniquely associated with the particular tracking subject. Moreover, the functionality profile is not uniquely associated with the particular subject identifier component, either. Rather, the functionality profile is universal for all subject identifiers of a same model. For example, a company XYZ may have produced 5,000 backpacks of a particular model, say, model M678, and the backpack 111 is one of the 5,000 backpacks produced. All of the 5,000 backpacks of that particular model have the same functionality profile as the one stored in the backpack 111. The functionality profile indicates that any backpack of the model M678 has a speaker and a high-capacity battery available at a paired communication component's disposal. Namely, any communication component that pairs with any one of the 5,000 backpacks of model M678 receives the same functionality profile from the backpack during the pairing process and can accordingly use the speaker or the high-capacity battery of the backpack to perform certain action as described above.

The one or more requirements associated with the child 110 that are fetched from the data store 171 by the tracking server 170 may be different for different functionality profiles. That is, the tracking server 170 may fetch different requirements associated with the child 110 depending on a specific functionality profile carried by the subject identifier component that is co-located with the child 110. For example, on a school day on which the child 110 does not bring the backpack 111, the child 110 may wear a wrist band as a subject identifier component. The wrist band contains the same subject identification that the backpack 111 does, as both the backpack 111 and the wrist band identify the same child 110. The wrist band contains neither a high-capacity battery nor a powerful speaker but has a vibration motor. Accordingly, the care giver 180 enters one or more requirements that involves how the care giver 180 intends to utilize the wrist band, e.g., turning on the vibrator as a reminder instead of generating a siren sound. Thus, with the functionality profile embedded in the wrist band, the requirements involving utilizing the vibrator would be fetched instead of the requirements involving utilizing the powerful speaker and the high-capacity battery of the backpack 111. As another example, the child 110 may go to the school 117 by riding an electric scooter, another subject identifier component that contains the subject identification that identifies the child 110. The one or more requirements saved in the data store 171 may thus include how the care giver would like to utilize the electric scooter, e.g., shutting down the power of the electric scooter when the location information collected by the communication component 112 that pairs with the electric scooter indicates that the child 110 may be traveling outside the geographical area 119. Moreover, the geographical area 119 may have different boundaries as compared to when the communication component 112 pairs with the backpack 111, because the care giver 180 may allow or expect the child 110 to take a route different from the route 118 when the child 110 goes to the school 117 by riding the electric scooter.

In some embodiments, the communication component 112 may transmit a low-power or low-battery indication to the tracking server 170 when the battery of the communication component 112 or the battery of the backpack 111 is having a low battery level. The low-battery indication may specifically indicate whether it is the communication component 112 or the subject identifier component 111 that is experiencing a low battery level. In an event that a low battery level is experienced while the child 110 is being tracked, the low-battery indication enables the tracking server 170 to expect a possible loss of wireless connection 115, or a possible inability to perform certain actions (e.g., generating a loud siren sound by the speaker of the backpack 111). In addition, the communication component 112 can also send the low-battery indication via the cellular network to the care giver 180. Moreover, the communication component 112 can trigger an action (e.g., generating a beeping sound) to remind the child 110 about the low battery level, so that the child 110 can replace or recharge the battery if possible.

Also tracked in the example tracking scenario 100 of FIG. 1 is the adult 120. The communication component 122 disposed in or on the vehicle 126 pairs with the arm band 121 worn by the adult 120 as soon as the adult 120 enters or gets close to the vehicle 126. During the pairing process, the communication component 122 obtains from the arm band 121 the subject identification that identifies the adult 120. The communication component 122 transmits the subject identification to the tracking server 170 via the wireless connection 125. The tracking server 170 subsequently fetches from the data store 171, based on the subject identification, one or more requirements associated with the adult 120, and transmits the one or more requirements to the communication component 122. Based on the location information and the one or more requirements, the communication component 122 can trigger an action to be performed with respect to the adult 120. In some embodiments, the communication component 122 may periodically or continuously report its location information to the tracking server 170. Based on the location information received from the communication component 122 as well as the one or more requirements fetched from the data store 171, the tracking server 170 can also trigger an action to be performed with respect to the adult 120.

In one example tracking application of the adult 120, the one or more requirements associated with the adult 120 may be a speed limit at which the adult 120 is allowed to operate the vehicle 126 as a driver. The speed limit associated with the driver 120 may vary depending on where the vehicle 126 is located, which can be inferred by the location information collected by the communication component 122. The speed limit may for example be higher if the driver 120 is driving the vehicle 126 on a freeway, and lower if the driver 120 is driving the vehicle 126 on a local street. The location information includes both a geolocation and a moving speed of the communication component 122. The communication component 122 can trigger an action based on the location information and the one or more requirements. In an event that the communication component 122 constantly transmits the location information to the tracking server 170, the tracking server 170 can also trigger the action. The action for example may be that, in an event that the vehicle 126 is moving above the speed limit, the communication component 122 sends a command to a speaker of the vehicle 126 to generate a sound or a voice message as a reminder to the driver 120 to reduce the speed of the vehicle 126. In some embodiments, the communication component 122 can even send a command to bypass the driver 120 and directly control the driving speed of the vehicle 126 to be below the speed limit Meanwhile, an action indication may be transmitted from the communication component 122 to the tracking server 170 to indicate that the communication component 122 has deactivated the acceleration pedal of the vehicle 126 and taken over driving speed thereof.

The adult 120 may be a driver who is in the process of developing a good driving habit of safe driving, so the one or more requirements associated with the adult 120 (e.g., the speed limit for the driver 120 on a certain kind of road) may start with some lower value. The one or more requirements are entered into the data store 171, prior to the adult 120 driving the vehicle 126, by the adult 120 himself/herself, or by a care giver 180, such as a driving coach of the adult 120. As the adult 120 becomes a safer driver over time, the speed limit may be updated accordingly, for example to a higher allowed driving speed.

In some embodiments, the subject identifier, i.e., the arm band 121, has certain functionalities other than carrying the subject identification of the adult 120, which can be utilized to provide further tracking capabilities. For example, the arm band 121 may include an actuator that is able to vibrate or contract, and either the tracking server 170 or the communication component 122 can command the actuator to vibrate or contract as a reminder to the driver 120 to reduce a driving speed of the vehicle 126. This feature may be particularly useful in an event that the driver 120 has hearing impairment, or that the driver 120 operates the vehicle 126 in a noisy environment where the driver 120 has difficulty perceiving a reminder in the form of a sound or a voice. A functionality profile included in the arm band 121 describes that the arm band 121 has the actuator available. The communication component 122 obtains the functionality profile from the arm band 121 as part of the pairing process with the arm band 121. Based on the functionality profile, the communication component 122 can trigger the actuator to generate the reminder to the driver 120 by actuating the actuator.

As another example, the arm band 121 may have a pulse sensor disposed thereon that is capable of measuring a rate of the heartbeat of the driver 120, or a blood pressure sensor disposed thereon that is capable of measuring a blood pressure of the adult 120. The adult 120 may, due to some medical problems, for example, be subject to having a low blood pressure or a low pulse rate under certain conditions, which would adversely affect an ability of the adult 120 to safely drive the vehicle 126. A functionality profile included in the arm band 121 describes that the arm band 121 is equipped with the pulse sensor or the blood pressure sensor. The communication component 122 obtains the subject identification of the adult 120 as well as the functionality profile of the arm band 121 during the pairing process with the arm band 121. After the communication component 122 transmits both the subject identification and the functionality profile to the tracking server 170, the tracking server 170 fetches from the data store 171, based on both the subject identification and the functionality profile, one or more requirements associated with the adult 120. The one or more requirements include a set of allowed driving speed limits under various health conditions of the adult 120 as he or she operates the vehicle 126 as a driver. According to the one or more requirements, the maximum allowed driving speed for the driver 120 varies not only based on an immediate geolocation of the vehicle 126, but also based on an immediate health condition of the driver 120. The immediate health condition of the driver 120 is reflected on a pulse rate or a blood pressure reading of the driver 120, as measured by the pulse rate sensor or the blood pressure sensor of the arm band 121. The communication component 122 receives from the tracking server 170 the one or more requirements associated with the driver 120. Based on the one or more requirements, the communication component 122 can impose a varying speed limit to the vehicle 126 depending on an immediate pulse rate or the blood pressure reading of the driver 120 as provided by the arm band 121.

In another example tracking application of the adult 120, the vehicle 126 is an autonomous car configured to serve different passengers, one passenger at a time, including the adult 120. The one or more requirements associated with the adult 120 as a passenger includes information regarding a destination to which the adult 120 intends to go. The information regarding the destination may be entered by the adult 120 or the care giver 180 prior to the adult 120 boarding the vehicle 126. After pairing with the arm band 121 and obtaining the subjection identification that identifies the passenger 120, the communication component 122 transmits the subject identification to the tracking server 170, and in return receives from the tracking server 170 the information regarding the destination. Based on the information regarding the destination, as well as an immediate geolocation of the communication component 122 itself, an action can be triggered to command the autonomous vehicle 126 to take the passenger 120 to the destination from the immediate geolocation.

In addition to providing a ride to take the passenger 120 to the destination, the autonomous vehicle 126 also aims to make the ride as smooth and comfortable as the passenger 120 would like. For example, the passenger 120 may want to avoid a bumpy ride, and the autonomous vehicle 126 is, for example, configured to reduce its speed when driving over a rough road surface. To achieve this end, the one or more requirements associated with the passenger 120 further includes a bumpiness level the passenger 120 could tolerate during the ride, which might be specified using a maximum value of acceleration/deceleration in one, two, or all three axes of the Cartesian space as the vehicle 126 takes the passenger 120 to travel along the trajectory 128 to the destination. In some embodiments, the communication component 122 may include various sensors, such as one or more accelerometers and/or a 3-axis gyroscope, to sense the bumpiness the passenger 120 experiences along the trajectory 128. That is, the communication component 122 is capable of sensing a motion pattern, represented by the acceleration and deceleration of the communication component 122, as part of the location information it collects. In the event that the motion pattern exceeds the maximum value of acceleration/deceleration specified in the one or more requirements, the communication component 122 can trigger an action by sending a command to the autonomous vehicle 126 to reduce the driving speed so as to mitigate the bumpiness the passenger 120 experiences. In some alternative embodiments, the communication component 122 does not include the sensors. Rather, the various sensors are disposed to or otherwise included in the arm band 121. The arm band has a functionality profile embedded therein that describes the various sensors. The communication component 122 obtains the functionality profile as part of its pairing with the arm band 121 to know that the arm band 121 has such sensors available, and subsequently utilizes the sensors by communicating to the arm band 121, as the vehicle 126 moves along the trajectory 128, to obtain acceleration/deceleration readings from the sensors.

The autonomous vehicle 126 may serve many more passengers other than the adult 120, each passenger having a different set of requirements, e.g., a different destination and/or a different level of bumpiness that the passenger can tolerate. In some embodiments, the communication component 122 can include a memory or data cache that stores the requirements for each particular passenger after the communication component 122 receives the requirements from the wireless network. As a result, when a particular passenger boards the vehicle 126 for the second time, the communication component 122 can access the passenger's requirements from the memory even if the wireless connection 125 cannot be established for the moment.

Pets 130 and 140 are also among the tracking subjects in the example tracking scenario 100 as illustrated in FIG. 1. Each of the pets 130 and 140 is associated with a set of requirements saved in the data store 171. A care giver of the pets, such as the care giver 180, may have sent the requirements via either the UE 181 or the interface terminal 182 to the tracking server 170 to be saved in the data store 171. The set of requirements may, for example, include a daily amount of pet food prescribed to the respective pet. The pet 130 may be a big-size dog, which is prescribed to consume two pounds of pet food each day. On the other hand, the pet 140 may be a mid-size dog, which is prescribed to consume one pound of pet food each day. The communication components 131 and 141 are attached to, and paired with, the collars 131 and 141 that are worn by the pets 130 and 140, respectively. The communication components 131 and 141 obtain from the collars 131 and 141 the subject identification that identifies the pet 130 and the subject identification that identifies the pet 140, respectively. In response to sending to the tracking server 170 the subject identification that identifies the pet 130, the communication component 132 receives, from the tracking server 170 and via the wireless connection 135, the daily amount of pet food prescribed to the pet 130, i.e., two pounds. Likewise, in response to sending to the tracking server 170 the subject identification that identifies the pet 140, the communication component 142 receives, from the tracking server 170 and via the wireless connection 145, the amount of pet food prescribed to the pet 140, i.e., one pounds.

Each of the communication components 132 and 142 is capable of collecting location information of itself, which includes, for example, an immediate location and a motion pattern. The immediate location and the motion pattern collected by communication component 132 represent those of the pet 130, as the communication component 132 is co-located with the pet 130. Likewise, the location information collected by communication component 142 represents that of the pet 140. In some embodiments, the communication components 132 and 142 may respectively transmit the location information to the tracking server 170, which may in turn relay the location information to the care giver 180 via the UE 181 or the interface terminal 182, so that the care giver may know the immediate locations and the motion patterns of the pets 130 and 140. The motion patterns may indicate whether the pets are walking, running, jumping, immobile, or lying down. The motion pattern may be collected by various sensors embedded in the communication components 132 and 142, such as accelerometers or gyroscopes.

Both the pets 130 and 140 are located within an environment in which they are free to move around. The environment includes a pet food dispenser 136 that is capable of dispensing pet food via an outlet 137. The set of requirements associated with the pet 130 further includes a predetermined proximity 139 around the pet food dispenser 136. It is intended that the pet food dispenser 136 dispenses pet food according to the daily amount of food prescribed to the pet 130 when the pet 130 stays within the proximity 139. For instance, in the event that the location information of the pet 130, as detected by the communication component 132, indicates that the pet 130 enters and stays within the proximity 139 for a predetermined period of time, the communication component 132 can trigger an action to dispense pet food. Specifically, the communication component 132 issues a command to the pet food dispenser 136 to dispense an amount of pet food according to the daily amount of pet food prescribed to the pet 130. Since the dispensed pet food is intended for the pet 130 not the pet 140, in some embodiments, the communication component 132 may not issue the command to dispense the pet food until the location information collected by the communication component 142 indicates that the pet 140 is away from the proximity 139 by certain distance, so that a chance is lower for the pet 140 to come and snatch away the dispensed pet food that is intended to be consumed by the pet 130. The location information of the pet 140 can be communicated from the communication component 142 to the communication component 132 via a peer-to-peer (P2P) communication link established between the communication component 132 and the communication component 142, or via the wireless connections 135 and 145 as well as at least the cellular tower 161 of the cellular network.

In some embodiments, the set of requirements associated with the pet 130 also includes a per-dispense amount of the pet food that the pet food dispenser 136 dispenses to the pet 130 each time. That is, the pet food dispenser 136 does not dispense all of the daily amount of the pet food prescribed to the pet 130 in one dispense. Rather, the pet food dispenser 136 dispenses the daily amount of the pet food prescribed to the pet 130 in several dispenses, each time dispensing only the per-dispense amount of pet food. An action indication indicating a dispense of pet food may be transmitted from the communication component 132 to the tracking server 170 after each time the per-dispense amount of pet food is dispensed. The action indication may also include a time stamp indicating a time of a day the dispense is triggered. Based on the action indications received, the tracking server 170 can keep track of a tally of the pet food dispensed to the pet 130 during the day. In an event that the tally has exceeds the amount of pet food prescribed to the pet 130, the tracking server 170 can notify the communication component 132 to stop dispensing more pet food for the remaining of the day even if the pet 130 stays within the proximity 139.

Due to motions of a tracking subject, or for some other reasons, a tracking device may occasionally be dislocated from the tracking subject, and thus the location information collected by the communication component of the tracking device would not represent that of the tracking subject. For example, as the pet 130 jumps or runs, the collar 131, along with the communication component 132 attached thereon, may get loose and then separate from the pet 132. The communication component 132 is able to obtain, from sensors embedded in either the communication component 132 itself or the collar 131, a co-location indication which indicates that the collar 131 and the communication component 132 remain co-located with the pet 130. In some embodiments, the communication component 132 may obtain the co-location indication based on the location information it collects. If the location information includes a motion pattern of running or jumping, the communication component 132 would obtain the co-location indication indicating that the collar 131 and the communication component 132 are still attached to the pet 130. On the other hand, if the location information does not demonstrate a motion pattern of moving for a predetermined long period of time, the co-location indication may not be obtained, which indicates that the tracking device might have been separated from the tracking subject. Additionally or alternatively, in some embodiments, the communication component 132 may obtain the co-location indication based on a physiological sign of the pet 130, which is sensed by a sensor embedded in either the collar 131 or the communication component 132. For example, the collar 131 or the communication component 132 may have a temperature sensor, such as an infrared sensor or other types of thermometer, embedded thereon for sensing a body temperature of the pet 130. The collar 131 may also have a light sensor disposed on an inner side of the collar 131 for sensing a light intensity that the inner side of the collar 131 is exposed to. In an event that the temperature sensor senses a sudden change in temperature reading, or that the light sensor senses a sudden change in the light intensity, both of which could be resulted from the collar 131 getting separated from the pet 130, the co-location indication would indicate that the tracking device (i.e., the combination of the collar 131 and the communication component 132) does not remain physically together with the tracking subject (i.e., the pet 130). The communication component 132 may trigger an action further based on the co-location indication. In an event that the communication component 132 does not obtain a co-location indication indicating that the tracking device remains co-located with the tracking subject 130, the communication component 132 may stop further dispensing of the pet food even if the location information it collects indicates an immediate location within the proximity 139. Moreover, the communication component 132 may notify either or both of the tracking server 170 and the care giver 180 that the tracking device may have been detached or separated from the pet 130.

Example Apparatuses

Figure 2:
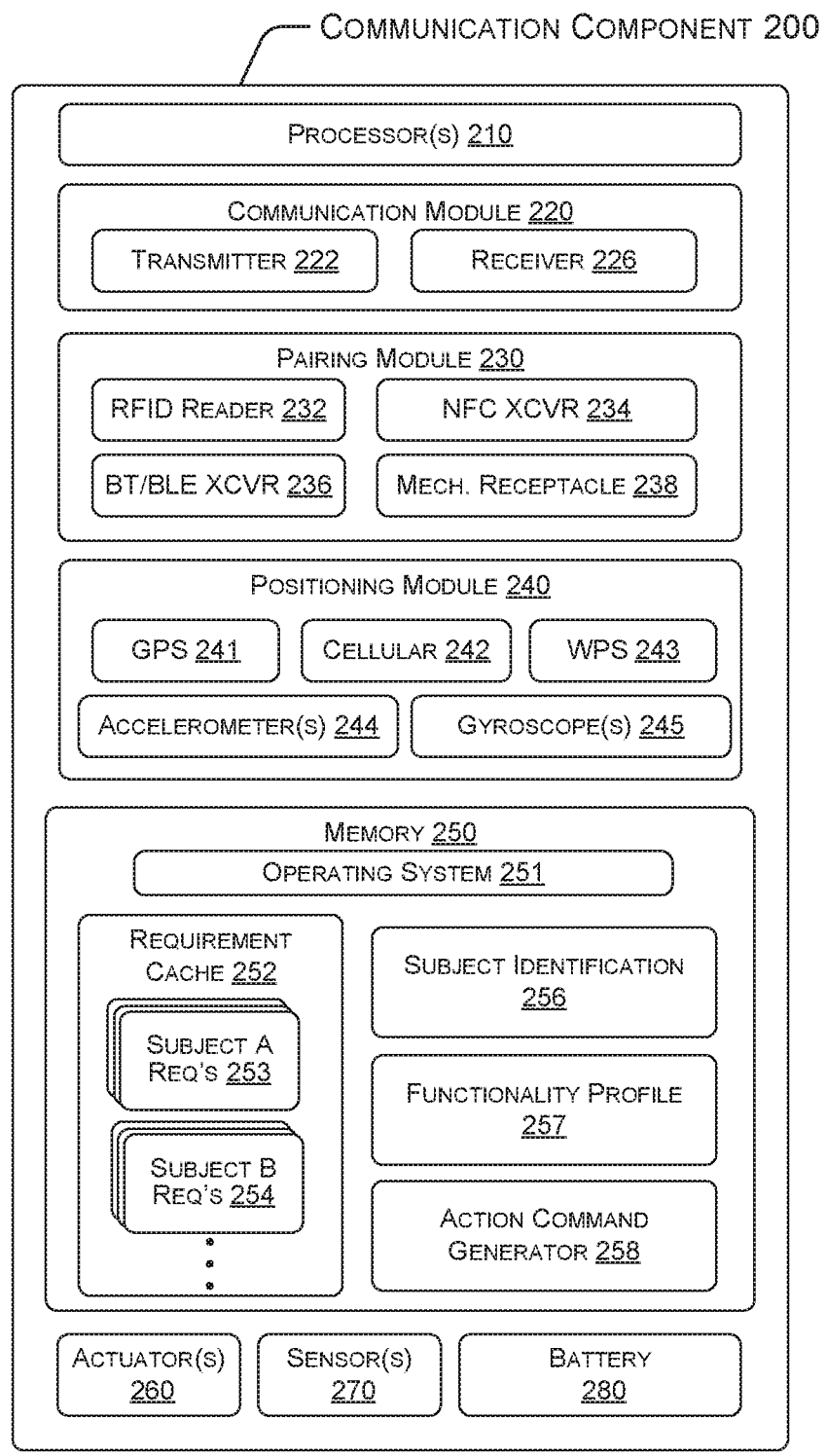
FIG. 2 shows illustrative details for a communication component implementable to the tracking scenario of FIG. 1.

FIG. 2 shows illustrative details of a communication component 200 that can be implemented as various communication components of FIG. 1 and support various functions described herein with respect to various embodiments and application scenarios as noted above. One or more instances of the communication component 200 can, for example, form a basis for the communication components 112, 122, 132 and 142 for tracking subjects 110, 120, 130 and 140 of FIG. 1 through various functions described with respect to the process 400 of FIG. 4.

The communication component 200 includes one or more processors 210, as well as a portable power source, i.e., a battery 280. The communication component 200 also includes various hardware modules including a communication module 220, a pairing module 230, and a positioning module 240. The communication component 200 further has a memory 250 that includes (but is not limited to) the various software components shown. In some embodiments, the communication component 200 may include one or more actuators 260 and one or more sensors 270. The actuators 260 and the sensors 270 may include various kinds of actuators and sensors that can interact with a tracking subject. The actuators 260 may for example include a speaker, such as the speaker included in the communication component 112 as described above. The actuators 260 may also include other types of actuators, such as a vibrator, a contraction motor, a pneumatic valve, a flash light, a mechanical lock, or a heating/cooling element. The sensors 270 may include a temperature sensor, an infrared sensor, or a thermometer, as those included in the communication component 132 as described above. Various functions provided by a sensor embedded in a subject identifier component in the tracking scenario 110 may alternatively be provided by one or more of the sensors 270 instead. For example, unlike the collar 131 worn by the pet 130, the collar 141 worn by the pet 140 may not be equipped with a light sensor, nor a temperature sensor. However, the communication component 142, which is embodied by the communication component 200 of FIG. 2, may include a light sensor and a temperature sensor among the sensors 270. Therefore, the light sensor and the temperature sensor, as part of the sensors 270 of the communication component 142, can be utilized to sense a change in the ambient temperature and light intensity in the same way as described above for the light sensor and the temperature sensor embedded in the collar 131.

The positioning module 240 is capable of collecting location information of the communication component 200. The location information includes an immediate geolocation of the communication component 200. The positioning module 240 includes a GPS receiver 241 capable of determining the immediate geolocation by receiving GPS satellite signals. The positioning module 240 also includes a cellular positioning component 242 that is able to triangulate the immediate geolocation using location information of nearby cellular towers of the cellular network (e.g., cellular towers 161 and 162) along with relative cellular signal strengths from those cellular towers. The positioning module 240 may further include components using other geolocating techniques such as Wi-Fi positioning or Internet geolocation, for example a WPS locator 243. As shown in FIG. 2, the positioning module 240 also includes a WPS component capable of determining the immediate geolocation through a Wi-Fi positioning system. In some embodiment, the location information may also include a motion pattern of the communication component 200. The motion pattern indicates whether the tracking subject may be running, jogging, walking, jumping, riding a vehicle, or is involved in other kinds of motion. The positioning module 240 is capable of determining the motion pattern based on inputs from one or more accelerometers 244 and one or more gyroscopes 245.

The pairing module 230 is capable of pairing the communication component 200 with a subject identifier component (e.g., the backpack 111, the arm band 121, the collar 131, or the collar 141 of FIG. 1) to form a tracking device. The subject identifier component includes a subject identification that identifies a tracking subject (e.g., the child 110, the adult 120, the pet 130, or the pet 140 of FIG. 1). The pairing between the communication component 200 and the subject identifier component enables the tracking device to track the tracking subject identified by the subject identification. As described in greater detail further below, the pairing module 230 is able to pair with the subject identifier component when the subject identifier component is mechanically engaged with, or within a vicinity of, the communication component 200 so that a corresponding wired or wireless communication link between the pairing module 230 and the subject identifier component is established, at least for a certain period of time. Through the wired or wireless communication link, the pairing module 230 obtains the subject identification from the subject identifier component. As noted elsewhere herein, in some embodiments, the subject identifier component also includes a functionality profile, which describes various functionalities of the subject identifier component. Through the wired or wireless communication link, the pairing module 230 also obtains the functionality profile from the subject identifier component. The communication component 200 and the subject identifier component remain paired with one another as long as the communication link therebetween remains established. On the other hand, the communication component 200 and the subject identifier component become unpaired from one another after the communication link therebetween has failed for a predetermined period of time. A wired communication link may fail when the communication component 200 is physically disconnected from the subject identifier component. A wireless communication link may fail to establish when the communication component 200 is apart from the subject identifier component farther than a range over which the pairing module 230 can effectively communicate.

As noted elsewhere herein, the communication link for pairing the communication component 200 with the subject identifier can employ a short-range communication protocol, such as NFC, RFID, BT or BLE. The subject identification embedded in the subject identifier component can be embodied as a RFID tag or an NFC tag, or stored in a memory of the subject identifier component. Therefore, the pairing module 230 employs various short-range transceivers capable of establishing a short-range communication link with the subject identifier component. As shown in FIG. 2, the pairing module 230 includes a RFID reader 232 capable of reading a subject identification taking a form of a RFID tag that is embedded in a subject identifier component, as well as an NFC transceiver 234 capable of reading a subject identification taking a form of an NFC tag that is embedded in a subject identifier component. The pairing module 230 further includes a BT/BLE transceiver 236 capable of reading a subject identification stored in a memory embedded in a subject identifier component.

Figure 3:
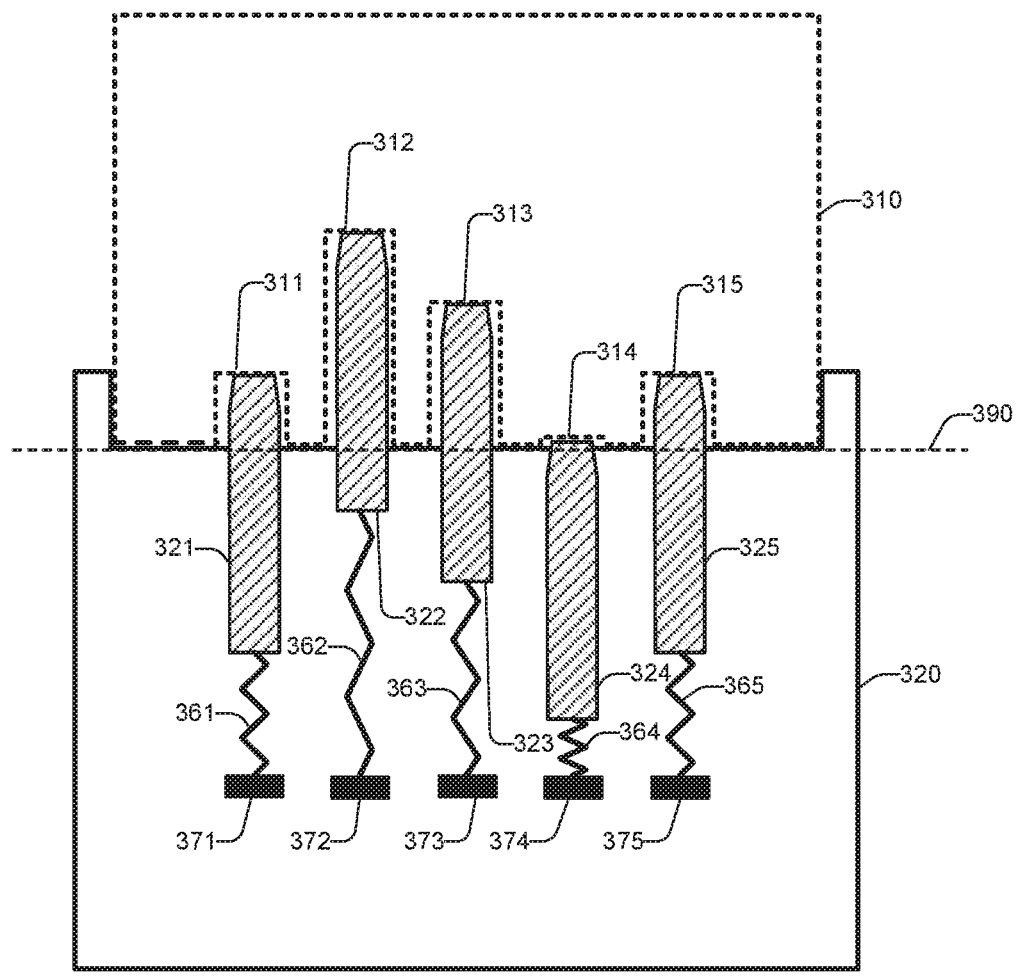
FIG. 3 shows illustrative details for a mechanical receptacle of the communication component of FIG. 2, as well as a mechanical shape received by the mechanical receptacle.

In some embodiments, a subject identifier component and a communication component may be paired with one another through a mechanical means, an electro-mechanical means, or an opto-mechanical means. For example, the pairing module 230 includes a mechanical receptacle 238, which is a sub-component configured to receive a mechanical shape included in or disposed on a subject identifier component. The mechanical shape represents a subject identification that identifies a tracking subject. The mechanical receptacle 238 may be embodied by a mechanical receptacle 320 of FIG. 3, which is configured to receive a mechanical shape 310 of a subject identifier component. As shown in FIG. 3, the mechanical shape 310 has slots 311, 312, 313, 314 and 315, each having a specific depth that represents a respective digit of a subject identification that identifies a particular tracking subject. The subject identification represented by the mechanical shape 310 may be a 5-digit number "13201". When received by or otherwise mechanically engaged with the mechanical receptacle 320, the depths of the slots 311-315 can be sensed or otherwise detected by the mechanical receptacle 320, such that the subject identification "13201" is obtained by the communication component 200. Namely, the mechanical receptacle 320 has a mechanism of detecting the depths of the slots 311-315, thereby obtaining the subject identification.

Specifically, the mechanical receptacle 320 is provided with five pins 321, 322, 323, 324 and 325 of a same length, each of which is supported by one of five identical springs 361, 362, 363, 364 and 365, respectively. Before the mechanical receptacle 320 receives the mechanical shape 310, all of the pins 321-325 extend above a baseline 390 by a same amount. When the mechanical receptacle 320 receives the mechanical shape 310, as shown in FIG. 3, each of the pins 321-325 is engaged with a respective slot of the slots 311-315. An end wall of each of the slots 311-315 pushes the respective pin downward such that the pin extends above the baseline 390 by an amount defined by the depth of the respective slot. A force is exerted on each of the springs 361-365 by the end wall of the respective slot pushing down the pin connected to the respective spring. The shallower the depth of the respective slot, the stronger the force is exerted on the respective spring. For instance, the slot 314 is the shallowest slot among the slots 311-315, and thus the spring 364 experiences the largest force exerted thereon among the springs 361-365. The slot 312 is the deepest slot among the slots 311-315, and thus the spring 362 experiences the slightest force exerted thereon among the springs 361-365. Slot 311 and slot 315 have a same depth, and thus the springs 361 and 365 experience substantially a same amount of force. As shown in FIG. 3, each of the springs 361-365 has one end connected to a respective one of the pins 321-325, and the other end connected to a respective one of five pressure sensors 371, 372, 373, 374 and 375. The amount of force of each of the springs 361-365 is sensed by the respective pressure sensor connected thereon. For instance, the pressure sensor 371 is configured to sense the force exerted on the spring 361 due to the slot 311 pushing down the pin 321, thereby generating a pressure reading that represents the force. Similarly, each of the pressure sensors 372-375 reads the force exerted on the springs 362-365 in a same way. Consequently, when the mechanical receptacle 320 receives the mechanical shape 310, the readings of the pressure sensors 371-375 represent the depths of the slots 311-315, which collectively represent the subject identification. The mechanical shape 310 and the mechanical receptacle 320 may be designed to engage with one another only in one specific physical orientation such that the subject identification is represented without any ambiguity. For example, in an event that the mechanical shape 310 is flipped horizontally by 180 degrees, the mechanical receptacle 320 would not receive the mechanical shape 310, thereby eliminating a possibility that the mechanical receptacle 320 detects the digits of the subject identification in reverse order.

Refer back to the illustrative details of the communication component 200 of FIG. 2. The memory 250 includes programs or software procedures that, when executed by processor(s) 210, cause the communication component 200 to perform various functions described herein. As shown in FIG. 2, the memory 250 includes an operating system 251, which includes components that manage or otherwise coordinate processor(s) 210 with software resources to perform various functions generally associated with a computer. In addition, the memory 250 stores a subject identification 256, which is a copy of the subject identification obtained by the pairing module 230 in the pairing process with the subject identifier component. For example, provided that the communication component 200 embodies the communication component 112, which is paired with the backpack 111, the subject identification 256 is thus a copy of the subject identification embedded in the backpack 111, which identifies the child 110. In an event that the pairing module 230 additionally obtains a functionality profile from the subject identifier component, the memory 250 also stores a copy of the functionality profile as a functionality profile 257. For example, provided that the communication component 200 embodies the communication component 122, which pairs with the aim band 121 that includes a functionality profile, the functionality profile 257 is thus a copy of the functionality profile. The functionality profile 257 may describe that the arm band 121 is equipped with a vibration actuator, and the communication component 200 may accordingly trigger an action that can be performed by the arm band 121 actuating the vibration actuator. In some embodiments, the subject identification 256 and the functionality profile 257 are purged, i.e., reset to a null value, as soon as the communication component 200 becomes unpaired with the subject identifier component. In some embodiments, the subject identification 256, along with the functionality profile 257, if applicable, remain stored in the memory 250 even after the communication component 200 becomes unpaired with any subject identifier component. The memory 250 of the unpaired communication component 200 can thus be checked to tell which tracking subject the communication component 200 was most recently paired to. The subject identification 256 and the functionality profile 257 are then replaced, after the communication component 200 pairs with a new subject identifier component, by those of the new subject identifier component.

The memory 250 also includes a requirement cache 252, which stores requirements associated with tracking subjects that the communication component 200 receives from the cellular network. For example, provided that the communication component 200 embodies the communication component 122 disposed in the autonomous vehicle 126, the requirement cache 252 can store a destination and/or a bumpiness level for each of the various passengers the autonomous vehicle 126 has served. In another example where the communication component 200 embodies the communication component 132, the requirement cache 252 thus stores the daily amount of pet food prescribed to the pet 130. The requirement cache 252 may keep a copy of the requirements associated with a particular tracking subject even after the communication component 200 is unpaired with a subject identifier component that carries the subject identification of the tracking subject. Namely, the requirement cache 252 may store requirements for more than one tracking subject, such as a set of requirements 253 for a subject A, and a set of requirements 254 for a subject B, and so on. For example, the communication component 200 may for one day be attached to the collar 131 worn by the pet 130, and for the next day attached to the collar 141 worn by the pet 140. As a result, the requirement cache 252 would store both the daily amount of pet food prescribed to the pet 130 (which may be included in the requirements 253) as well as the daily amount of pet food prescribed to the pet 140 (which may be included in the requirements 254). However, at most only one set of requirements stored in the requirement cache 252, i.e., the set of requirements associated with the subject identified by the subject identification carried by the subject identifier component with which the communication component 200 is currently paired, is actively used by the communication component 200.

As described elsewhere herein, requirements associated with a tracking subject can be dynamically changed or updated by either the tracking subject or a care giver. In example embodiments, the communication component 200 receives updated versions of the requirements associated with the tracking subject identified by the subject identification 256 from the cellular network. The communication component 200 saves the updated requirements in the requirement cache 252, and then operates based on the updated requirements. Nonetheless, there may be occasions where current or updated requirements are not readily or quickly available to the communication component 200 (e.g., the communication component 200 happens to be located in an area that is not covered by the cellular network). With the requirements saved in the requirement cache 252, regardless of whether those requirements are a most updated version or not, the communication component 200 can still operate certain, if not all, tracking functions, even if the communication component 200 is temporarily out of range of the cellular network. For example, the driver 120 may drive the vehicle 126 to an area where the wireless connection 125 cannot be established, which results in the communication component 122 not being able to access the most updated version of the speed limits associated with the driver 120 that are saved in the data store 171. The communication component 122, embodied by the communication component 200, can still function based on the speed limits associated with the driver 120 that are stored in the requirement cache 252 of the communication component 122 to advise the driver 120 to drive under the speed limits.

The memory 250 further includes an action command generator 258, a software module which is capable of triggering an action based on the location information collected by the positioning module 240 as well as the requirements stored in the requirement cache 252 that are associated with the tracking subject identified by the subject identification 256. The action command generator 258 is capable of generating a command to enable various actions to be performed as described elsewhere herein. The action command generator 258 of the communication component 112 may for example trigger the speaker of the communication component 112 to generate the beeping sound to remind the child 110 as the child 110 travels out of the geographical area 119. The action command generator 258 of the communication component 122 may, for example, trigger the autonomous vehicle 126 to take the passenger 120 to a destination. The action command generator 258 of the communication component 132 may, for example, trigger the pet food dispenser 136 to dispense a certain amount of pet food when the pet 130 has been within the proximity 139 for a predetermined period of time. In some embodiments, the action command generator 258 may generate a command further based on a co-location indication. For example, without the communication component 132 receiving a co-location indication indicating that the pet 130 is still wearing the collar 131, the action command generator 258 of the communication component 132 may generate a command that prevents the pet food dispenser 136 from dispensing further pet food.

The communication module 220 includes a transmitter 222 and a receiver 226, through which the communication module 220 is able to establish a wireless connection with a cellular network, such as the wireless connections 115, 125, 135 and 145 of FIG. 1. Via the wireless connection established with the cellular network, the communication module 220 is able to exchange various data or information items with the cellular network, including, for example, the subject identification 256, the functionality profile 257, one or more requirements stored in the requirement cache 252 that are associated with the tracking subject identified by the subject identification 256, the location information collected by the positioning module 240, an action indication, a co-location indication, and/or a low-battery indication. In some embodiments, the communication module 220 also transmits, via the wireless connection with the cellular network, a command to an apparatus communicatively coupled to the cellular network to trigger the apparatus to perform an action with respect to the tracking subject. In some embodiments, the communication module 220 may, also via the transmitter 222 and the receiver 226, be capable of establishing a wireless connection with a wireless router, such as the wireless router 165. Moreover, the transmitter 222 and the receiver 226 may also enable the communication component 200 to communicate with the subject identifier component, another communication component, or an apparatus located within a proximity of the communication component 200, via a P2P or a short-range communication protocol.

The memory 250 optionally includes computer-readable storage media. Computer-readable storage media can include or encompasses volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

Example Process

Figure 4:
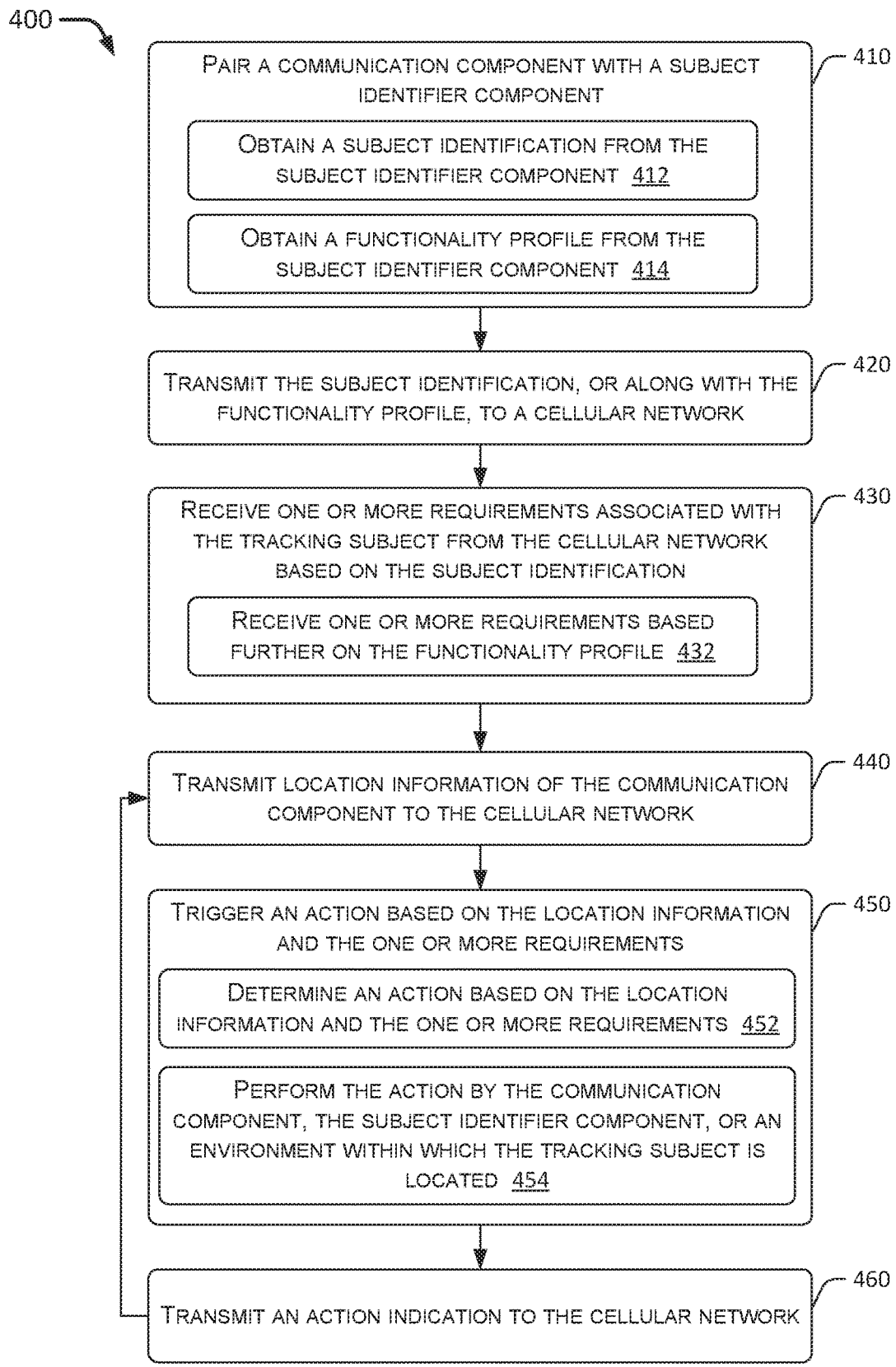
FIG. 4 is a flow diagram of an illustrative process for implementing techniques that enable various tracking functions in the tracking scenario of FIG. 1.

FIG. 4 illustrates an example process 400 that encompasses embodiments and tracking applications variously described herein. The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to FIGS. 1-3. Process 400 may include blocks 410, 420, 430, 440, 450 and 460. Process 400 may begin at block 410.

At block 410, the process 400 involves pairing a communication component with a subject identifier component. As variously described elsewhere herein, in example embodiments the pairing may be initiated by the pairing module 230 of the communication component 200. The communication component may embody each of the communication components 112, 122, 132, and 142, which are paired with the subject identifier component 111, 121, 131, and 141, respectively. Block 410 includes a sub-block 412, at which the process 400 involves the communication component obtaining a subject identification from the subject identifier component. The subject identification identifies a tracking subject with which the communication component and the subject identifier component are co-located. For example, during the process of pairing with the backpack 111, the communication component 112 obtains from the backpack 111 a subject identification that identifies the child 110. As a result, a copy of the subject identification is saved in the memory 250 of the communication component 112 as the subject identification 256. In some embodiments, block 410 may also include a sub-block 414, at which the process 400 involves the communication component obtaining a functionality profile from the subject identifier component. The functionality profile describes various functionalities of the subject identifier component. For example, the backpack 111 can be equipped with a powerful speaker, and thus includes a functionality profile that describe the power speaker. During the process of pairing with the backpack 111, the communication component 112 obtains from the backpack 111 functionality profile and saves the functionality profile in the memory 250 of the communication component 112 as the functionality profile 257. Process 400 may proceed from block 410 to block 420.

At block 420, the process 400 involves transmitting the subject identification, either by itself or along with the functionality profile, to a cellular network. As variously described elsewhere herein, in example embodiments a wireless connection to the cellular network can be established by the communication module 220. The wireless connection can be used via the transmitter 222 to transmit the subject identification 256 and the functionality profile 257 to the cellular network. For example, the communication component 112, via the wireless connection 115 established between the communication component 112 and a cellular network, transmits the subject identification that identifies the child 110 to the tracking server 170, which is part of the cellular network. In some embodiments, the communication component 112 may also transmit the functionality profile that described the powerful speaker to the tracking server 170. Process 400 may proceed from block 420 to block 430.

At block 430, the process 400 involves receiving from the cellular network one or more requirements associated with the tracking subject based on the subject identification. As variously described elsewhere herein, in example embodiments one or more tracking requirements are associated with each tracking subject. The tracking requirements may be saved in a data store of the cellular network prior to the tracking, and then downloaded to the tracking device for tracking the subject. For example, based on the subject identification that identifies the child 110, which has been transmitted from the communication component 112, the tracking server 170 can query the data store 171 to fetch a set of requirements associated with the child 110. The communication component subsequently receives the set of requirements from the tracking server 170. The set of requirements may include the geographical area 119 within which the child is allowed or expected to travel on a school day. The set of requirements may also include the instruction to command the communication component 112 to generate a reminder to the child 110 in an event that the child 110 travels outside the geographical area 119. In some embodiments, block 430 may also include a sub-block 432, at which the process 400 involves the communication component receiving the set of requirements that is further based on the functionality profile. For example, the set of requirements the communication component receives may include an instruction to generate a loud siren using the powerful speaker included in the backpack 111 in an event that the child 110 is possibly subjected to a dangerous situation such as a vertical fall. Process 400 may proceed from block 430 to block 440.

At block 440, the process 400 involves the communication component transmitting location information of the communication component to the cellular network. As variously described elsewhere herein, in example embodiments the location information can include an immediate geolocation of the communication component, as well as a motion pattern of the communication component. In example embodiments where the communication component is embodied by the communication component 200, the location information can be collected by the positioning module 240. Specifically, the geolocation can be detected using one or more of the GPS receivers 241, the cellular positioning component 242, and the WPS locator 243. The motion pattern can be determined based on input from the accelerometers 244 and the gyroscopes 245. The communication component 200 can transmit the location information to the cellular network using the communication module 220. The location information can be transmitted in accordance with a pre-established or updated protocol, e.g., on a periodic basis and/or in response to various internal and/or environmental conditions. For example, whenever the wireless connection 115 is established, the communication component 112 may transmit the location information of the communication component 112 to the tracking server 170 on a periodic basis when the child 110 travels outside the geographical area 119. The location information is a close representation of the geolocation and the motion pattern of the child 110. Process 400 may proceed from block 440 to block 450.

At block 450, the process 400 involves triggering an action based on the location information as well as the one or more requirements received at block 430. Block 450 includes sub-blocks 452 and 454. At sub-block 452, the process 400 involves the communication component determining an action based on the location information and the one or more requirements. At sub-block 454, the process 400 involves performing the action determined at sub-block 452 by the communication component, the subject identifier component, or an environment within which the tracking subject is located. For example, in response to the location information collected by the communication component 112 indicating that the child 110 is traveling outside the geographical area 119, the communication component 112 determines that a reminding beeping sound is to be generated, and subsequently generates the beeping sound using a speaker equipped on the communication component 112. As another example, in response to the location information collected by the communication component 112 indicating that the child 110 has just experienced a large vertical fall, the communication component 112 determines to use the powerful speaker of the backpack 111 to generate a loud siren, and subsequently sends a command to the backpack 111 to generate the loud siren using the powerful speaker. As yet another example, in response to the location information collected by the communication component 132 indicating that the pet 130 has been within the proximity 139 for a predetermined period of time, the communication component 132 determines to use the pet food dispenser 136 to dispense an amount of pet food, and subsequently sends a command to the pet food dispenser 136 to dispense the amount of pet food. Process 400 may proceed from block 450 to block 460.

At block 460, the process 400 involves the communication component transmitting an action indication to the cellular network, wherein the action indication indicates the triggering of the action as determined in sub-block 452. For example, after the communication component 132 triggers the pet food dispenser 136 to dispense the amount of pet food, the communication component 132 subsequently sends to the tracking server 170 an action indication indicating that the amount of pet food has been dispensed with the pet 130 within the proximity 139. Process 400 may return from block 460 to block 440 for continuing tracking the tracking subject.

Various embodiments described herein provide technical advantages that enable greater and more flexible functionalities to be provided in tracking one or more subjects with higher efficiency and lower operation cost. Specifically, a modular tracking device according to the present disclosure is formed by pairing a generic communication component with a subject-specific subject identifier component. This feature enables a higher efficiency of tracking multiple subjects, especially a large number of subjects (e.g., cattle or hundreds of cows), due to the flexibility of being able to arbitrarily pair up multiple generic communication components with multiple subject identifier components. This feature also enables a higher efficiency of operation by minimizing downtime due to recharging the battery of the communication component, because a communication component that runs out of battery can be freely replaced by another communication component that is already fully charged. Moreover, this feature enables a user to reduce a cost of operation if a user has various (i.e., two or more) subjects to track but only needs to track one of them at any given time. This is because in example embodiments, a subject identifier component can simply include a passive memory store of a subject identification, for example, a RFID or NFC tag, that requires no battery power, and thus can be made very cheap and light-weight. The user therefore only needs to own a single communication component which, despite a possibly higher cost due to various hardware and software components included therein, is able to pair with various subject identifier components to track the various subjects, not to mention that for each of the various subjects the tracking device can be customized to fulfill specific tracking requirements associated with the particular subject by receiving the tracking requirements through a cellular network.

From a device manufacturer's standpoint, the two-component tracking device provides great economic benefits in reducing the cost for developing various tracking devices. Specifically, there is no need to certify each of the various tracking devices individually. A device manufacturer of the two-component tracking devices only needs to spend efforts and costs for developing communication components, such as obtaining various industrial standard certifications. The certified communication component(s), being generic, can thus pair with many kinds of subject identifier components, for which industrial standard certifications are usually not required, to form various kinds of modular tracking products capable of tracking different kinds of subjects.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for monitoring a location of a tracking subject using a tracking device comprising a communication component and a subject identifier component paired with one another, comprising:
   pairing the communication component with the subject identifier component, both the communication component and the subject identifier component being co-located with the tracking subject, the communication component capable of establishing a wireless connection with a tracking server using a cellular network, the communication component also capable of collecting location information of the communication component, the subject identifier component comprising a subject identification that identifies the tracking subject;
   in response to pairing the communication component with the subject identifier component, determining, by the communication component, the subject identification that identifies the tracking subject based on the subject identifier component;
   in response to pairing the communication component with the subject identifier component, transmitting, by the communication component to the tracking server via the cellular network, the subject identification;
   in response to transmitting the subject identification to the tracking server, receiving, by the communication component and from the tracking server using the wireless connection via the cellular network, one or more requirements corresponding to a location associated with the tracking subject based on the subject identification; and
   triggering, by the communication component, an action based on the location information collected by the communication component and the one or more requirements, the action performed by the communication component, the subject identifier component, or an environment within which the tracking subject is located.

2. The method of claim 1, wherein the communication component does not comprise the subject identification that identifies the tracking subject.

3. The method of claim 1, wherein the pairing of the communication component with the subject identifier component comprises obtaining, by the communication component from the subject identifier component, the subject identification.

4. The method of claim 1, further comprising:
   transmitting, from the communication component to the tracking server using the wireless connection via the cellular network, the location information; and
   transmitting, from the communication component to the tracking server using the wireless connection via the cellular network, an action indication indicating the triggering of the action.

5. The method of claim 1, wherein:
   the tracking subject is a child;
   the subject identifier component comprises a backpack carried by the child;
   the one or more requirements comprise a predetermined geographical area within which the child is expected to travel within;
   the communication component or the backpack comprises a speaker; and
   the action comprises the speaker generating an alert sound in response to the communication component traveling outside the predetermined geographical area.

6. The method of claim 1, wherein:
   the tracking subject is a pet;
   the subject identifier component is a collar worn by the pet;
   the one or more requirements comprise a daily amount of pet food prescribed to the pet;
   the environment comprises a pet food dispenser;
   the action comprises the pet food dispenser dispensing an amount of pet food according to the daily amount of pet food prescribed to the pet; and
   the triggering of the action comprises sending a command from the communication component to the pet food dispenser in response to the pet being within a predetermined proximity of the pet food dispenser.

7. The method of claim 1, wherein:
   the subject identifier component is associated with a functionality profile describing a plurality of functionalities of the subject identifier component, and
   the one or more requirements are based further on the functionality profile.

8. The method of claim 1, further comprising:
   obtaining, by the communication component, a co-location indication indicating the tracking subject remains co-located with the communication component and the subject identifier component,
   wherein the triggering of the action is based further on the co-location indication.

9. The method of claim 8, further comprising:
   sensing, by the communication component, the physiological sign of the tracking subject, or
   receiving, by the communication component and from the subject identifier component, the physiological sign of the tracking subject, wherein
   the co-location indication comprises the physiological sign.

10. The method of claim 1, further comprising:
    transmitting, from the communication component to the tracking server using the wireless connection via the cellular network, a low-battery indication in response to the communication component or the subject identifier component having a low battery level.

11. The method of claim 1, wherein the communication component comprises a global positioning system (GPS) receiver for collecting the location information of the communication component.

12. The method of claim 1, wherein the location information comprises a motion pattern of the communication component, and wherein the communication component comprises an accelerometer, a gyroscope, or both, for detecting the motion pattern.

13. The method of claim 1, wherein:
   the subject identifier component comprises a radio-frequency identification (RFID) tag or a near-field communication (NFC) tag, the RFID tag or the NFC tag indicating the subject identification;
   the communication component comprises a RFID reader or an NFC reader; and
   the pairing comprises the RFID reader or the NFC reader scanning the RFID tag or the NFC tag to acquire the subject identification.

14. The method of claim 1, wherein the pairing comprises receiving, by the communication component and from the subject identifier component, the subject identification via a Bluetooth® low energy (BLE) communication link.

15. The method of claim 1, wherein:
   the subject identifier component comprises a mechanical shape configured to represent the subject identification,
   the communication component comprises a sub-component configured to receive the mechanical shape, and
   the pairing comprises the communication component acquiring the subject identification by using the sub-component to physically receive the mechanical shape.

16. A communication component of a tracking device comprising the communication component and a subject identifier component paired with one another for monitoring a location of a tracking subject, both the communication component and the subject identifier component being co-located with the tracking subject, the communication component comprising:
   one or more processors;
   a communication module capable of establishing a wireless connection with a tracking server using a cellular network;
   a pairing module capable of pairing with the subject identifier component;
   a positioning module capable of collecting location information of the communication component;
   a portable power source; and
   a memory having instructions stored therein, wherein the instructions, when executed by the one or more processors, cause the one or more processors to:
   receive, from the pairing module, data indicating that the communication component is paired with the subject identifier component;
   in response to receiving the data indicating that the communication component is paired with the subject identifier component, obtain a subject identification from the subject identifier component via the pairing module, the subject identification identifying the tracking subject;
   in response to receiving the data indicating that the communication component is paired with the subject identifier component, transmit the subject identification to the tracking server using the cellular network via the wireless connection;
   in response to transmitting the subject identification to the tracking server, receive from the tracking server, one or more requirements corresponding to the location associated with the tracking subject from the cellular network via the wireless connection;
   determine an action based on the one or more requirements and the location information, the action configured to be performed by the communication component, the subject identifier component, or an environment within which the tracking subject is located; and
   perform the action or transmit a command to the subject identifier component or the environment to perform the action.

17. The communication component of claim 16, further comprising: one or more actuators capable of performing the action.

18. The communication component of claim 16, wherein the instructions further cause the one or more processors to:
   obtain a functionality profile from the subject identifier component via the pairing module, the functionality profile describing a plurality of functionalities of the subject identifier component; and
   transmit the functionality profile to the tracking server using the cellular network via the wireless connection.

19. The communication component of claim 16, wherein:
   the pairing module comprises a short-range transceiver capable of establishing a short-range communication link with the subject identifier component, and
   the short-range communication link employs a radio-frequency identification (RFID) technology, a near-field communication (NFC) technology, or a Bluetooth® low energy (BLE) communication technology.

* * * * *